C. F. JENKINS.
LENS HOLDER.
APPLICATION FILED OCT. 17, 1916.

1,258,621. Patented Mar. 5, 1918.

Witness
Edwin L. Bradford

Inventor
C. F. Jenkins,
By Greene & Greene,
Attorney

UNITED STATES PATENT OFFICE.

CHARLES FRANCIS JENKINS, OF WASHINGTON, DISTRICT OF COLUMBIA, ASSIGNOR TO THE GRAPHOSCOPE COMPANY, OF WASHINGTON, DISTRICT OF COLUMBIA, A CORPORATION OF DELAWARE.

LENS-HOLDER.

1,258,621.  Specification of Letters Patent.  Patented Mar. 5, 1918.

Application filed October 17, 1913. Serial No. 128,065.

*To all whom it may concern:*

Be it known that I, CHARLES FRANCIS JENKINS, a citizen of the United States, and resident of Washington, in the District of Columbia, have invented certain new and useful Improvements in Lens-Holders, of which the following is a specification, reference being had therein to the accompanying drawing.

This invention relates to devices for holding lenses or lens members in cushioning non-conducting material and in such manner that the spacing may be quickly varied at will and the held devices may be instantly clamped or released.

In the accompanying drawings.

Figure 1:
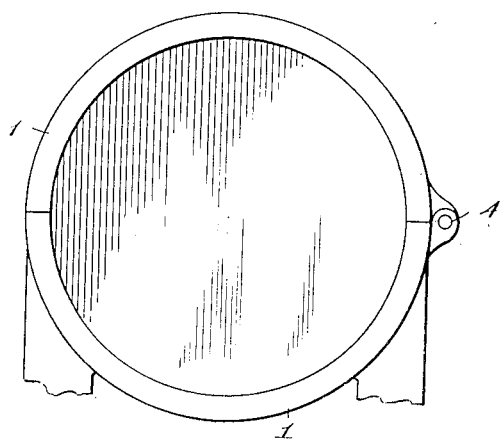
Figure 1 is an end view of the devices.
Figure 2:
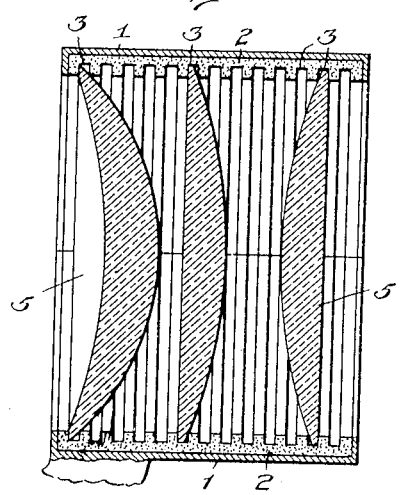
Fig. 2 is a vertical axial section of the same devices.

In these views, 1 represents a horizontal cylindrical casing having a thick lining 2 of asbestos, or the like, provided with a series of internal, slightly separated circumferential grooves 3. The casing and lining are divided into upper and lower halves which are hinged together at 4, and normally the upper part is held in closed position by gravity only. In certain of the grooves are placed lens members 5 which are spaced as desired by merely placing each in such groove as may be chosen. The lens members being so spaced, the upper part of the cylinder is swung to closed position and each member is thus held by a non-conducting cushion engaging its entire periphery and preventing its contact with metal at any point. The lens members may be shifted or replaced almost instantly since they may be freely lifted out or dropped into place when the case is opened. Free expansion and contraction of the casing and glass are not interfered with, and neither need be considered. At the same time the lens members are so cushioned that injury by sudden jars or blows is avoided. Under any conditions ordinarily existing in the use of such lenses the breaking of lenses heretofore unfortunately common, is practically eliminated, while change of lenses is greatly facilitated.

What I claim is:

1. A lens holder having a lower concave member lined with cushioning, non-conducting material provided with a series of parallel, groove-like depressions into any of which the peripheral portion of a lens member may be readily passed, and a similar upper member arranged to move down upon lens members in place in the lower member and similarly hold their upper peripheral portions, substantially as set forth.

2. A lens holder consisting of a cylinder divided into upper and lower portions lined with asbestos, or the like, and provided with a series of circumferential grooves adapted to receive and hold lens members in variously spaced relations.

3. A lens holder consisting of a longitudinally divided tubular structure having upper and lower portions provided with registering grooves in parallel planes, whereby it is adapted to hold a plurality of lens members in variously spaced relations.

In testimony whereof I hereunto affix my signature.

CHARLES FRANCIS JENKINS.